(12) United States Patent
Duncan et al.

(10) Patent No.: US 7,116,741 B2
(45) Date of Patent: Oct. 3, 2006

(54) COMPENSATION OF SAMPLING FREQUENCY OFFSET AND LOCAL OSCILLATOR FREQUENCY OFFSET IN A OFDM RECEIVER

(75) Inventors: Steve Duncan, Surrey (GB); Rob Heaton, Surrey (GB)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 762 days.

(21) Appl. No.: 10/009,770

(22) PCT Filed: Apr. 10, 2001

(86) PCT No.: PCT/JP01/03080

§ 371 (c)(1),
(2), (4) Date: Dec. 17, 2001

(87) PCT Pub. No.: WO01/80509

PCT Pub. Date: Oct. 25, 2001

(65) Prior Publication Data

US 2002/0159534 A1 Oct. 31, 2002

(30) Foreign Application Priority Data

Apr. 17, 2000 (GB) .................................. 000949.6

(51) Int. Cl.
*H04L 7/00* (2006.01)

(52) U.S. Cl. ...................... 375/355; 375/344; 375/349; 455/182.2; 455/192.2; 370/503

(58) Field of Classification Search ................ 375/260, 375/261, 324, 325, 340, 344, 349, 355, 362, 375/364, 371, 373; 455/164.1, 164.2, 182.1, 455/182.2, 182.3, 192.1, 192.2, 192.3; 370/464, 370/480, 503, 562, 576

See application file for complete search history.

(56) References Cited

U.S. PATENT DOCUMENTS

| 5,692,016 A | 11/1997 | Vanselow |
| 5,838,734 A | 11/1998 | Wright |
| 5,987,063 A | 11/1999 | Rinne |
| 6,304,545 B1 * | 10/2001 | Armbruster et al. ........ 370/210 |
| 6,628,730 B1 * | 9/2003 | Stott et al. .................. 375/344 |

FOREIGN PATENT DOCUMENTS

| EP | 0 730 357 | 9/1996 |
| EP | 0 795 985 | 9/1997 |
| EP | 0798 903 A2 | 10/1997 |
| EP | 0 849 919 | 6/1998 |
| EP | 0 872 985 | 10/1998 |
| EP | 0 901 259 | 3/1999 |
| JP | 09102774 A | 4/1997 |

* cited by examiner

Primary Examiner—Dac V. Ha
(74) Attorney, Agent, or Firm—Oblon, Spivak, McClelland, Maier & Neustadt, P.C.

(57) ABSTRACT

A partial Fourier Transform is performed, using Goertzel's algorithm, to calculate two frequency bins. A phase variation is calculated for each bin, the phase variation preferably representing the phase difference between the bin calculated by a Fourier Transform performed on samples in a guard interval and the bin calculated by a Fourier Transform performed on matching samples within the useful part of the symbol. The local oscillator frequency offset is compensated by summing the phase variations, and the sampling frequency offset is compensated by taking the difference between the phase variations.

25 Claims, 2 Drawing Sheets

COMPENSATION OF SAMPLING FREQUENCY OFFSET AND LOCAL OSCILLATOR FREQUENCY OFFSET IN A OFDM RECEIVER

TECHNICAL FIELD

This invention relates to OFDM demodulation. It is particularly, but not exclusively, concerned with fine tuning of an OFDM receiver.

BACKGROUND ART

A conventional OFDM receiver has a demodulator which has to be tuned very accurately to the received signal. The receiver sampling clock must also be accurately aligned to the received signal. Normally, the demodulator carries out coarse frequency synchronisation (signal acquisition) and fine frequency tuning or tracking. The demodulator also performs coarse timing (OFDM symbol synchronisation) and fine sample clock synchronisation.

The present invention is primarily concerned with fine frequency tuning and fine sample clock synchronisation. Various arrangements are known for carrying out these operations in such a way as to minimise the effect of multipath interference, which can give rise to inter-symbol-interference (ISI). Some such arrangements rely upon each OFDM symbol comprising a "useful part" and a "guard space", the guard space sometimes being referred to as a guard interval, cyclic extension or cyclic prefix. The guard space precedes the useful part of the symbol and contains a repeat of the data at the end of the useful part.

In some prior art arrangements, time-domain samples which are spaced apart by the useful symbol period are cross-correlated to achieve symbol synchronisation, fine frequency correction and sample clock adjustment. Other arrangements derive fine frequency and sampling timing control signals from the output of the conventionally-provided fast Fourier transform (FFT) block which is provided for demodulation of the time-domain samples.

It would be desirable to provide an improved technique for dealing with fine frequency and/or sampling clock offsets.

According to the present invention an OFDM receiver has, in addition to an FFT block for extracting data from a received signal, a further means for performing a partial and/or reduced Fourier transform on received time domain samples. A "partial" FT is one in which only a subset of the frequency bins is calculated. A "reduced" FT is one which has a set of bins which is smaller than the set which is used to demodulate the OFDM signal, i.e. it is a short FT. The partial and/or reduced Fourier transform can derive a phase variation value, for a particular frequency output bin, which represents an error resulting from mis-tuning of the local oscillator frequency. Alternatively, or additionally, the contents of two output bins of the partial and/or reduced FFT car be evaluated to determine two separate phase variations, any difference between those phase variations resulting from an error in the sample clock frequency. Accordingly, the partial and/or reduced FT can provide signals for correcting the local oscillator frequency and/or the sample clock.

In the preferred embodiment, each phase variation represents the difference between the phase angles of the same output bin for different parts of the OFDM symbol, those different parts containing the same data. This is done by performing the partial and/or reduced FT on samples of the guard space and the matching samples in the useful part of the symbol. In this embodiment, because several samples in the guard space match corresponding samples in the useful part of the symbol, it is sufficient to perform a reduced FT on groups of samples. Only one or two bins need to be calculated.

In an alternative embodiment, which is particularly applicable to OFDM transmissions containing pilot signals of known value, each phase variation can represent the difference between the phase of the complex sample in a particular output bin and the expected phase of a pilot signal. In this embodiment, it is necessary to resolve an individual pilot symbol, so one or two frequency bins of a full FT are calculated.

DISCLOSURE OF INVENTION

The present invention has a number of potential benefits. Some of these are a result of requring only a partial and/or reduced FT for carrying out the local oscillator and/or sampling frequency synchronisations, as this can be performed relatively simply. In accordance with a particularly preferred aspect of the invention, the partial and/or reduced FT is derived using Goertzell's algorithm. This is an efficient method of calculating just a few bins of a DFT.

Instead of using the signals derived from the phase variations for controlling fine tuning of a local oscillator, the signal could be used for compensating for the resulting errors in the digitised samples. Also, instead of using a signal derived from the phase variations for controlling the sample clock, the signal can be used to control an interpolator for deriving corrected digitised samples obtained using an un-synchronised sampling clock.

BRIEF DESCRIPTION OF DRAWINGS

An arrangement embodying the invention will now be described by way of example with reference to the accompanying drawings, in which.

BEST MODE FOR CARRYING OUT THE INVENTION

Figure 1:
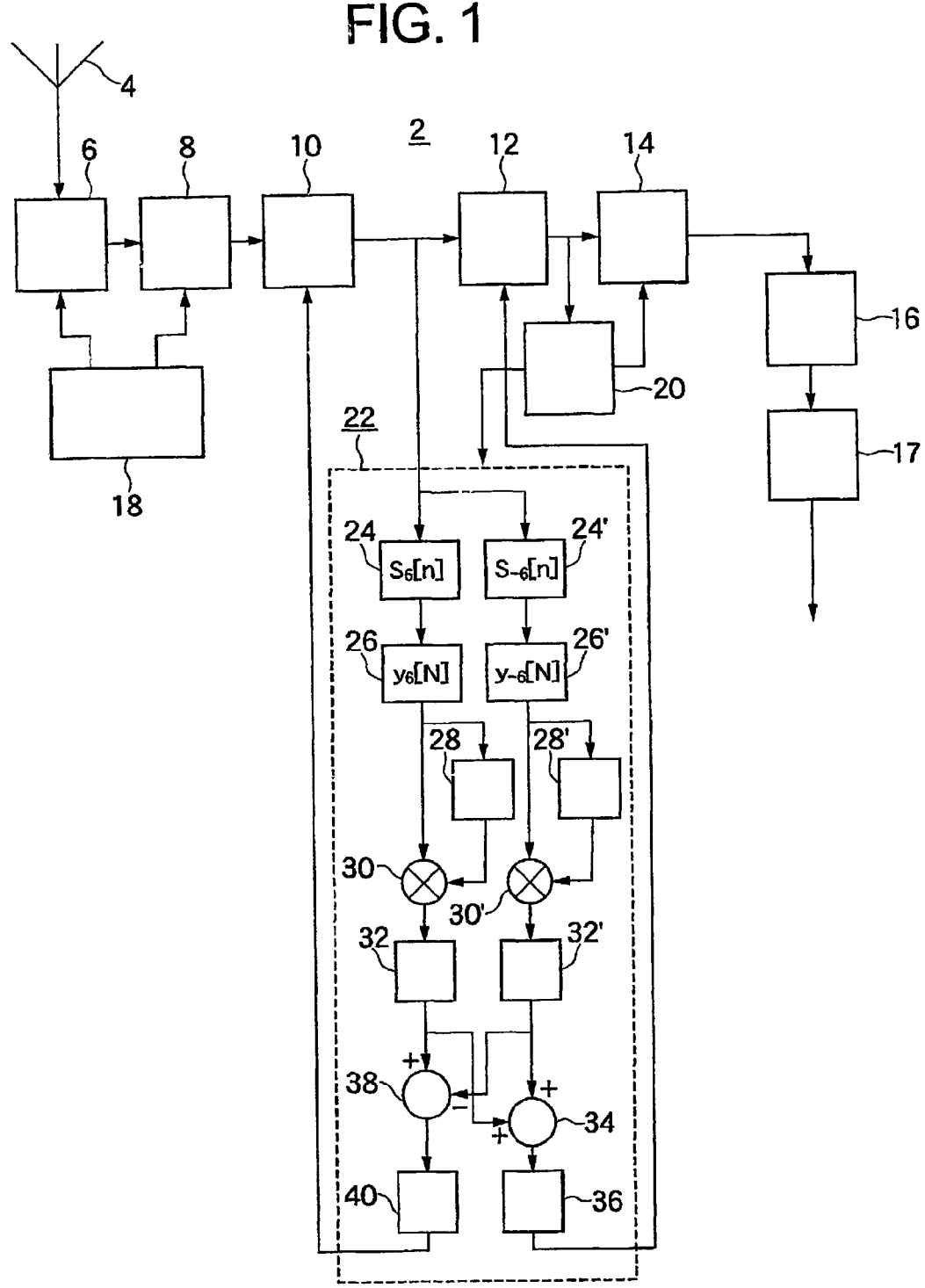
FIG. 1 is a block diagram of an OFDM receiver in accordance with the invention.

Referring to FIG. 1, an OFDM receiver 2 comprises an antenna 4 which receives a signal and presents it to a down-converter 6 which converts the RF signal to an IF signal. This is then converted into a baseband signal by an IF-to-baseband converter 8. This produces at its output complex samples of each transmitted OFDM symbol. These complex samples are digitised by an analog-to-digital (A/D) converter 10. A phase rotator 12 applies phase rotation to the samples, to compensate for slight errors in the local oscillator frequencies used by the down converter 6 and the IF-to-baseband converter 8. The samples are then delivered to a Fast Fourier Transform (FFT) circuit 14. The FFT circuit 14 converts the samples from the time domain to the frequency domain, and symbol data provided at the output is sent to a channel estimator and corrector 16 and a decoder 17.

If desired, the complex samples from the A/D converter 10 and/or a signal from the channel estimator and corrector 16 may also be delivered to a frequency synchronisation circuit 18, which is used to control the local oscillator frequencies used by the down converter 6 and the IF-tobaseband converter 8; however, it is also possible to implement the receiver without requiring such feedback.

The complex samples are also delivered to a symbol synchronisation circuit 20, which generates a synchronisation pulse for use by the Fast Fourier Transform (FFT) circuit 14. The FFT circuit 14 requires the synchronisation pulse so that each transformation operation is aligned with the start of the OFDM symbol.

The present invention is directed to novel and inventive techniques which are embodied in a fine-tuning synchronisation circuit 22 which controls the fine frequency adjustment achieved by the phase rotator 12 and which also achieves fine adjustment of the sampling clock used by A/D converter 10 to align this accurately to the received signal.

Figure 2:
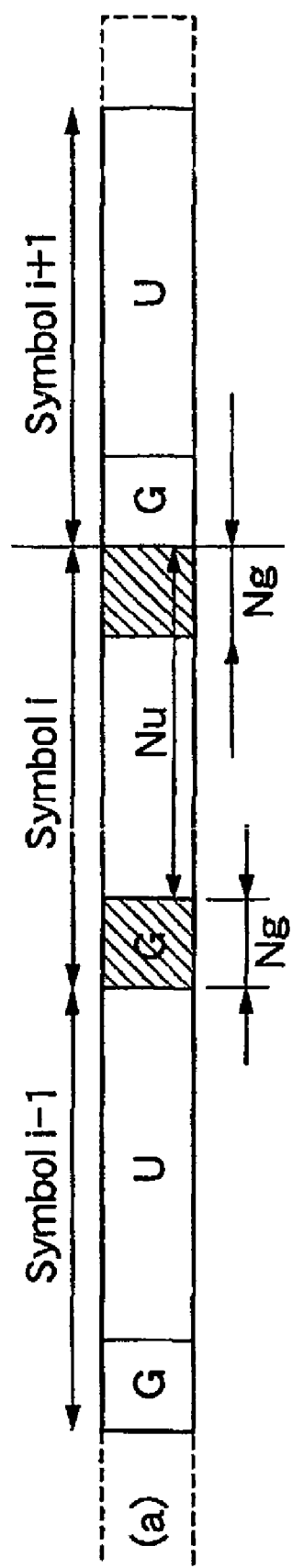
FIG. 2 represents an OFDM signal.

Referring to FIG. 2, it is assumed that an OFDM symbol consists of Nu+Ng samples, representing Nu samples in the useful part U of the signal, preceded by Ng samples in the guard space G. The Ng samples in the guard space G contain the same data as the last Ng samples of the useful part U of the symbol (as indicated, in respect of one of the symbols, by hatching).

These samples are delivered from the A/D converter 10 to the synchronisation circuit 22. This is represented diagrammatically as a hardware arrangement, but in practice it is likely to be implemented at least partially in software.

The samples are delivered to block 24, which, in combination with block 26, is operable to calculate a single bin of a DFT performed on selected groups of samples from each symbol. In the present embodiment, blocks 24 and 26 calculate bin+6 of a 16 point DFT, which is performed on a first set of 16 samples taken from the end of the guard interval and a second set comprising the 16 corresponding matching samples at the end of the OFDM symbol. The calculation is performed using Goertzel's algorithm.

In accordance with Goertzel's algorithm, block 24, which is effectively an IIR filter, performs the following calculation on each received sample $$s_k[n]=x[n]+2\cdot\cos(2\cdot k\cdot\pi/N)\cdot s_k[n-1]-s_k[n-2]$$

where:

$s_k[-2]=s_k[-1]=0.0$; n equals the sample number and N equals the total number of samples used in calculating the DFT, in this case 16. k represents the bin being calculated, in this case +6.

At the end of each set of 16 samples, block 26 calculates the complex value for the +6 bin, which is:

$$y_k[n]=s_k[n]-W^*_N\cdot S_k[n-1]$$

where:

$$W^*_N=\exp(j\cdot 2\pi\cdot k/N)$$

The resultant value for the 16 samples at the end of the guard interval is then delayed for a period corresponding to Nu samples, as indicated by block 28, so that it can be supplied together with the value for the corresponding set of samples in the useful part of the signal, to a correlator 30. The angle value, or argument, of the result of the correlation is sent to a store 32, which averages the output of the correlator 30 provided over successful symbol periods.

Blocks 24' to 32' perform exactly the same function as blocks 24 to 32, except that in this case the value for bin−6, i.e. k=−6, is calculated.

If the receiver frequency and sampling clock are precisely tuned, the calculated value for each bin at the end of the guard period will be identical to the value calculated for the same bin at the end of the OFDM symbol. If, however, there is a slight offset of frequency, the values for the same bin will be different. The difference between the values for bin+6 will correspond to the difference between the values for bin−6, and will be representative of the frequency error.

If the sample clock is slightly offset in frequency, this will also give rise to a difference between the values calculated for the same bin at the different parts of the OFDM symbol. However the difference between the two values calculated for bin+6 (at the end of the guard interval and the end of the symbol) will not be the same as the difference between the two values calculated for the bin−6. The phase difference between the values calculated for the same bin will vary from bin to bin, the amount of variation corresponding to the sample clock frequency offset.

In order to make use of these characteristics, the outputs of the stores 32 and 32' are summed at a summer 34, the output being delivered to a store 36. The output of the store represents the tuning frequency offset, and is used to control the phase rotator 12.

Furthermore, the difference between the outputs of stores 32 and 32' is calculated by a subtractor 38, the output of which is delivered to a store 40. The stored value represents the amount by which the phase difference between the values calculated for bin+6 differ from the phase difference between the values calculated for bin−6, and represent sample frequency offset. The output of store 40 is used to control the sample clock frequency used by A/D converter 10.

The stores 36 and 40 can be arranged to provide outputs which represent-the received values multiplied by a-suitable constant, which depends on the sensitivity of the receiver tuning and sample clock control circuits.

In this embodiment, the value $s_k[n]$, where k=±6, is calculated for every sample of each symbol, but the value $y_k[n]$ is calculated only once for each set of 16 samples for each coefficient k, i.e. once at the end of the guard interval and once at the end of the symbol for k=+6, and the same for k=−6, and thus four times in total for each symbol. This substantially reduces the amount of processing required. It is not necessary to calculate the values $s_k[n]$ for all samples; if desired, it would be possible to calculate these only for each of the samples within the two sets of 16. It would of course also be possible to calculate the value $y_k[n]$ for every calculated $s_k[n]$ value.

In order to match the operation of the synchronising circuit 22 with each OFDM signal, the circuit preferably receives a signal from the symbol synchronising circuit 20.

Various modifications of this embodiment are possible. For example, the output of the store 36 could be used to control the local oscillator frequencies employed by the frequency synchronisation circuit 18, in which case it is possible for the phase rotator 12 to be eliminated. The sampling clock used by the analog-to-digital converter 10 could be free-running, rather than synchronised, the output of the store 40 instead being used to control an interpolator to reconstitute the correct samples from the output of the converter 10.

It is desirable to use a set of samples located at the end of the guard interval, the other set comprising the matching samples at the end of the symbol, as the effects of multipath distortion are minimised. However, other matching samples could be selected.

The fine-tuning synchronisation circuit 22 could be used only for compensating for errors in sample clock frequency. Alternatively, the circuit 22 could be used only for compensating for errors in tuning frequency; in this case, the components 24' to 32' could if desired be omitted and the output of store 32 used for the fine frequency tuning compensation.

An alternative embodiment of the invention does not rely on guard intervals, but instead relies upon the presence of pilot signals of known phase in specific frequency slots. This alternative embodiment operates similarly to that of FIG. 1. However, in this case N is set equal to the number of samples in each OFDM symbol, so that individual frequency bins are resolved. k is set to correspond to the frequency bins of particular pilot signals. The delays 28, 28' and correlators 30, 30' are replaced by comparators for comparing the phase angles of the calculated frequency bins associated with respective pilot signals with predetermined, expected phase angles.

This arrangement requires calculation of one or more bins of a full DFT, but nevertheless does not require calculation of all bins.

What is claimed is:

1. A method of compensating for sampling frequency offset in an OFDM receiver which samples a received multicarrier signal and performs a Fourier Transform on the sampled signal to extract data therefrom, the method comprising:
    performing a separate Fourier Transform on the sampled signal, the separate Fourier Transform being a partial and/or reduced Fourier Transform to derive phase values for at least two points thereof; and
    compensating for the sampling frequency offset in dependence on a difference between phase variations at the respective points, each phase variation representing a difference between the phase value derived for that point and further phase data.

2. A method as claimed in claim 1, wherein each phase variation represents the difference between phases at two parts of an OFDM symbol which includes a guard space, the two parts being separated by an interval corresponding to a useful part of the symbol.

3. A method as claimed in claim 2, wherein one part is at an end of the guard space.

4. A method as claimed in any preceding claim, wherein the separate Fourier Transform is a reduced Fourier Transform.

5. A method as claimed in claim 1, wherein each of the two points of the separate Fourier Transform corresponds to a respective pilot signal,
    each phase variation representing the difference between the determined phase value for the point and the expected phase value of the respective pilot signal.

6. A method as claimed in claim 1, including performing the compensation for the sampling frequency offset in dependence on phase values measured over a plurality of OFDM symbols.

7. A method as claimed in claim 1, wherein the separate Fourier Transform is a partial Fourier Transform.

8. A method as claimed in claim 7, wherein the partial Fourier Transform is performed using Goertzel's algorithm.

9. A method as claimed in claim 1, wherein the phase values for said points are calculated only in response to selected samples of the received signal.

10. A method as claimed in claim 1, wherein the compensation for the sampling frequency offset is performed by adjusting the sampling frequency.

11. A method as claimed in claim 1, wherein the compensation for the sampling frequency offset is performed by controlling interpolation of the sampled signal.

12. A method of synchronizing an OFDM receiver, the method comprising:
    compensating a sampling frequency offset of the OFDM receiver using a method as claimed in claim, 1; and
    compensating for a local oscillator-frequency offset in dependence upon the phase variation for at least one of said points.

13. An OFDM receiver operable to compensate for sampling frequency offset using the method as claimed in claim 1.

14. A method of compensating for a local oscillator frequency offset in an OFDM receiver which samples a received multicarrier signal and performs a Fourier Transform on the sampled signal to extract data therefrom, the method comprising:
    performing a separate Fourier Transform on the sampled signal, the separate Fourier Transform being a partial Fourier Transform to derive a phase value for at least one point thereof;
    deriving for said point a phase variation representing a difference between the phase value for said at least one point and a further phase value; and
    compensating for the local oscillator frequency offset in dependence on the phase variation,
    wherein the partial Fourier Transform is performed using Goertzel's algorithm.

15. A method as claimed in claim 14, wherein the phase variation represents a difference between two parts of an OFDM symbol which includes a guard phase, the two parts of the OFDM symbol being separated by an interval corresponding to a useful part of the symbol.

16. A method as claimed in claim 15, wherein one part is at an end of the guard space.

17. A method as claimed in claim 14, wherein the separate Fourier Transform is a reduced Fourier Transform.

18. A method as claimed in claim 14, wherein said point of the separate Fourier Transform corresponds to a pilot signal,
    each phase variation representing a difference between a determined phase value for the point and an expected phase value of the respective pilot signal.

19. A method as claimed in claim 14, including performing the compensation of the local oscillator frequency offset in dependence on phase values measured over a plurality of OFDM symbols.

20. A method as claimed in claim 14, wherein the phase value for said point are calculated only in response to selected samples of the received signal.

21. A method as claimed in claim 14, wherein the compensation for the local oscillator frequency offset is performed by adjusting the local oscillator frequency.

22. A method as claimed claim 14, wherein the compensation for the local oscillator frequency offset is performed by phase rotation of received and sampled signals.

23. An OFDM receiver operable to compensate for local oscillator frequency offset using the method as claimed in claim 14.

24. A method of synchronising an OFDM receiver which samples a received multicarrier signal and performs a Fourier Transform on the sampled signal to extract data therefrom, the method comprising:
    performing a separate Fourier Transform on the sampled signal, the separate Fourier Transform comprising a partial and/or reduced Fourier Transform to derive phase values for at least two points thereof;

determining, for each point, a phase variation corresponding to the difference between the phase values at different parts of an OFDM symbol separated by the useful part of the symbol;

compensating for an offset of the sampling frequency in dependence on the difference between the phase variations; and compensating for an offset of a local oscillator frequency in dependence on at least one of the phase variations.

25. An OFDM receiver operable to perform a synchronising operation using the method as claimed in claim 24.

* * * * *

UNITED STATES PATENT AND TRADEMARK OFFICE
CERTIFICATE OF CORRECTION

| | |
|---|---|
| PATENT NO. | : 7,116,741 B2 |
| APPLICATION NO. | : 10/009770 |
| DATED | : October 3, 2006 |
| INVENTOR(S) | : Duncan et al. |

Page 1 of 1

It is certified that error appears in the above-identified patent and that said Letters Patent is hereby corrected as shown below:

On the title page, Item (30), the foreign application priority data is incorrect. Item (30) should read:

-- (30)     Foreign Application Priority Data

Apr. 17, 2000 (GB) ................................ 0009494.6 --

Signed and Sealed this

Twelfth Day of June, 2007

JON W. DUDAS
*Director of the United States Patent and Trademark Office*